United States Patent [19]

Ohtani et al.

[11] 4,413,249
[45] Nov. 1, 1983

[54] VEHICLE FUEL-EFFICIENCY WARNING DEVICE

[75] Inventors: Yoshio Ohtani, Higashimatsuyama; Michio Wakiya, Yoshimi; Todomu Kakishima, Kamifukuoka, all of Japan

[73] Assignee: Diesel Kiki Co., Ltd., Tokyo, Japan

[21] Appl. No.: 359,852

[22] Filed: Mar. 19, 1982

[30] Foreign Application Priority Data

Mar. 23, 1981 [JP] Japan ................ 56-04073

[51] Int. Cl.³ .................................. G01M 15/00
[52] U.S. Cl. ............................. 340/52 R; 73/112
[58] Field of Search .............. 73/116, 114, 112; 340/52 R, 62, 52 F

[56] References Cited

U.S. PATENT DOCUMENTS 4,113,046  9/1978  Arpino ................ 73/112 X
4,275,378  6/1981  Henderson ........ 340/52 R X Primary Examiner—Jerry W. Myracle
Attorney, Agent, or Firm—Guy W. Shoup; Gerard F. Dunne

[57] ABSTRACT

A vehicle fuel-efficiency warning device for use in a vehicle driven by an internal combustion engine, which device comprises elements for producing a first detecting signal when an engine speed exceeds a predetermined upper limit, elements for generating a limit signal corresponding to an upper limit characteristic of the position of a member for adjusting the amount of fuel supplied to an internal combustion engine, the upper limit characteristic including a portion having a drop-off tendency in accordance with the increase of the engine speed, elements for producing a second detecting signal when the position of the member exceeds the upper limit of the member as determined by the limit signal; and elements for issuing a warning in response to the occurrence of the first or the second or both detecting signals.

8 Claims, 13 Drawing Figures

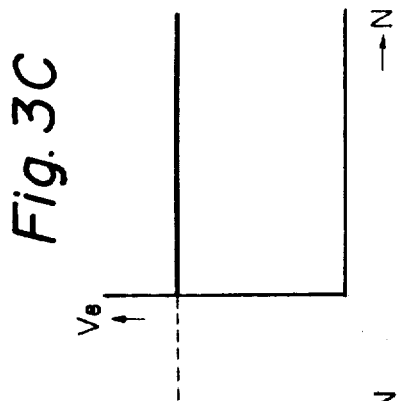
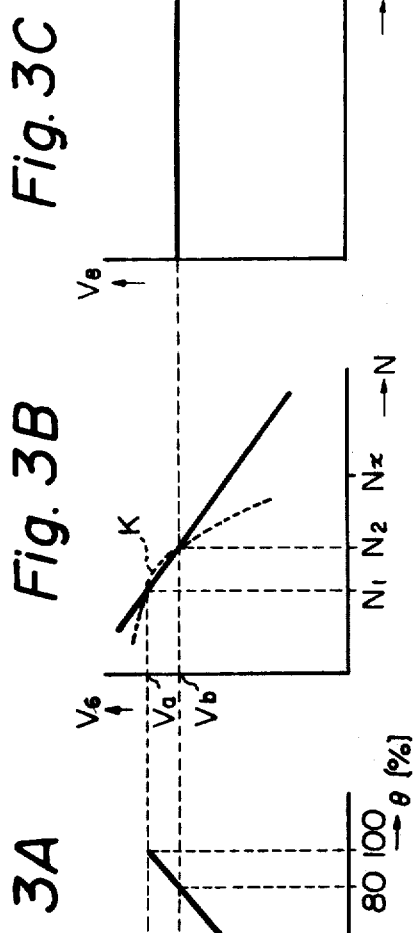
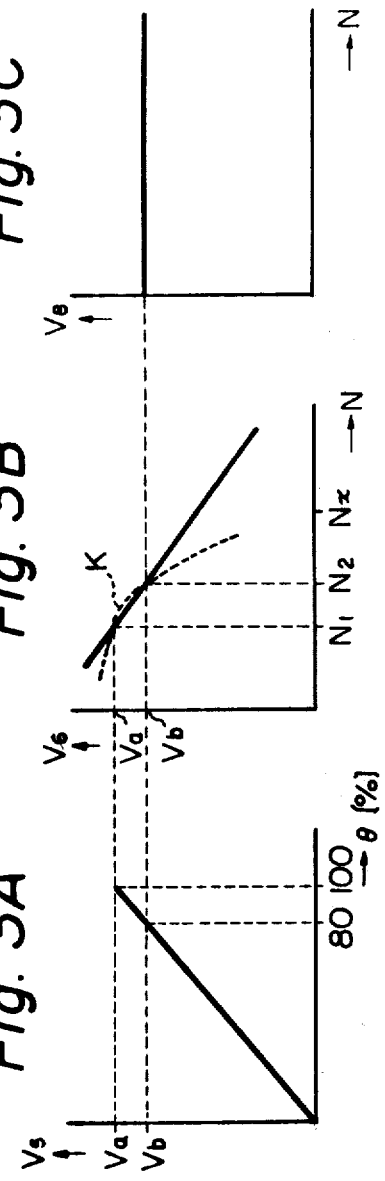
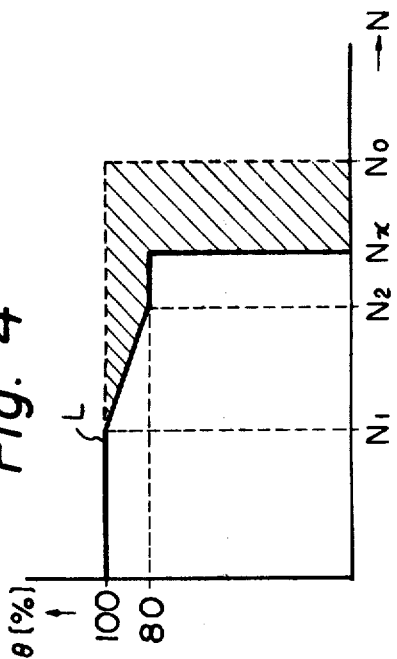

VEHICLE FUEL-EFFICIENCY WARNING DEVICE

The present invention relates to a vehicle fuel-efficiency warning device for issuing a warning to an operator of a vehicle driven by an internal combustion engine that the engine is not operating under the predetermined economical fuel-efficiency conditions.

In the prior art, in order to operate a vehicle driven by an internal combustion engine, such as a gasoline engine, diesel engine or the like, with fuel-efficient economy, various vehicle fuel-efficiency warning devices have been developed and put to practical use which are adapted to issue a warning to the operator when the vehicle is not operated under predetermined conditions of engine operation required for economical fuel-efficiency or economical fuel consumption. In the prior art devices of this type, there are provided some limits to engine speed or the degree of depression of the accelerator pedal (for example, limit values corresponding to 80% of the maximum engine speed and the maximum degree of depression of the accelerator pedal, respectively) or both and the device is arranged so as to issue a warning to the operator to urge the operator to operate the vehicle at an economical fuel consumption when the engine speed or the degree of depression of the accelerator pedal, or both, exceeds the respective limit value. Therefore, even if considerable acceleration is unavoidably required, it follows that the warning is issued without taking account of the actual circumstances involved on the basis just of the degree of depression of the accelerator pedal exceeding the set depression limit. Consequently, in situations where the degree of depression of the accelerator pedal is liable to exceed the limit value or where the full depression of the accelerator pedal is required, such as when ascending an incline, the warning is frequently issued pointlessly. This result is that the operator is liable to be unnecessarily fatigued by the excessive occurrence of pointless warnings.

It is, therefore, an object of the present invention to provide an improved vehicle fuel-efficiency warning device suitable for use in a vehicle driven by an internal combustion engine.

It is another object of the present invention to provide a vehicle fuel-efficiency warning device which is capable of issuing warnings effectively.

It is still another object of the present invention to provide a vehicle fuel-efficiency warning device which is capable of issuing warnings for urging an operator to operate the vehicle at a higher fuel-efficiency in accordance with the actual circumstances of operation of the vehicle.

It is a further object of the present invention to provide a vehicle fuel-efficiency warning device which is capable of effectively suppressing the excessive issue of pointless warnings to prevent an operator from becoming fatigued.

According to the present invention, there is provided a vehicle fuel-efficiency warning device for use in a vehicle driven by an internal combustion engine, which device comprises means for generating a first signal showing a rotational speed related to an engine speed of the internal combustion engine; means responsive to the first signal for producing a first detecting signal when the rotational speed exceeds a predetermined upper limit; means for generating a second signal related to the position of a member for adjusting the amount of fuel supplied to the internal combustion engien; means for generating a third signal corresponding to an upper limit characteristic of the position of the member, the upper limit characteristic including a portion having a drop-off tendency in accordance with the increase of the revolutional speed; means responsive to the second and the third signals for producing a second detecting signal when the position of the member exceeds the upper limit of the position of the member as determined by the third signal; and means for issuing a warning in response to the occurrence of the first or the second or both detecting signals.

The characteristic portion showing a drop-off tendency of the upper limit in accordance with the increase of the revolutional speed is preferably set in the intermediate speed range of the engine speed and the shape of this characteristic portion preferably approximates that of an equiefficient fuel consumption curve. With this characteristic of the upper limit of the member for adjusting the amount of fuel, in the intermediate speed range, the restriction on the amount of operation of the member for adjusting the amount of fuel supplied to the engine is gradually eased as the engine speed is decreased. As a result, it is possible to limit the operating amount of the member for adjusting the amount of fuel fed to the engine in strict accordance with the actual circumstance of the vehicle operation. For example, when the vehicle ascends an incline, the limits on the amount the fuel adjusting member may be operated are progressively eased with the decrease in engine speed.

The vehicle fuel-efficiency warning device may further comprise a delay circuit for rendering the issuing means operative a predetermined time after the time when the first or the second detecting signal is produced, or both. The delay circuit may be arranged so as to produce an electric signal in response to the continuous production for a predetermined time of the first and/or the second detecting signal. When the delay circuit is employed, since the producing means does not respond to the occurrence of the first and/or the second detecting signal for a shorter time than the predetermined time mentioned above, there is a remarkable decrease in issuing useless warnings due to the unavoidable large depression of the accelerator pedal or over operation of the member for adjusting the amount of fuel supplied to the engine, such as a control lever in the diesel engine system, an air flow valve for a carburetor in a gasoline engine system, so that the operator is sufficiently urged to operate the vehicle at a higher fuel-efficiency without unnecessary fatigue.

Further objects and advantages of the present invention will be appearent from the following detailed description to be read in conjunction with the accompanying drawings in which:

FIGS. 3A to 3C are characteristic curves showing the level setting of the voltages appearing in the circuit illustrated in FIG. 1, respectively;

FIG. 4 is a diagrammatic view showing a warning region in a map of the operating condition of an internal combustion engine;

Figure 1:
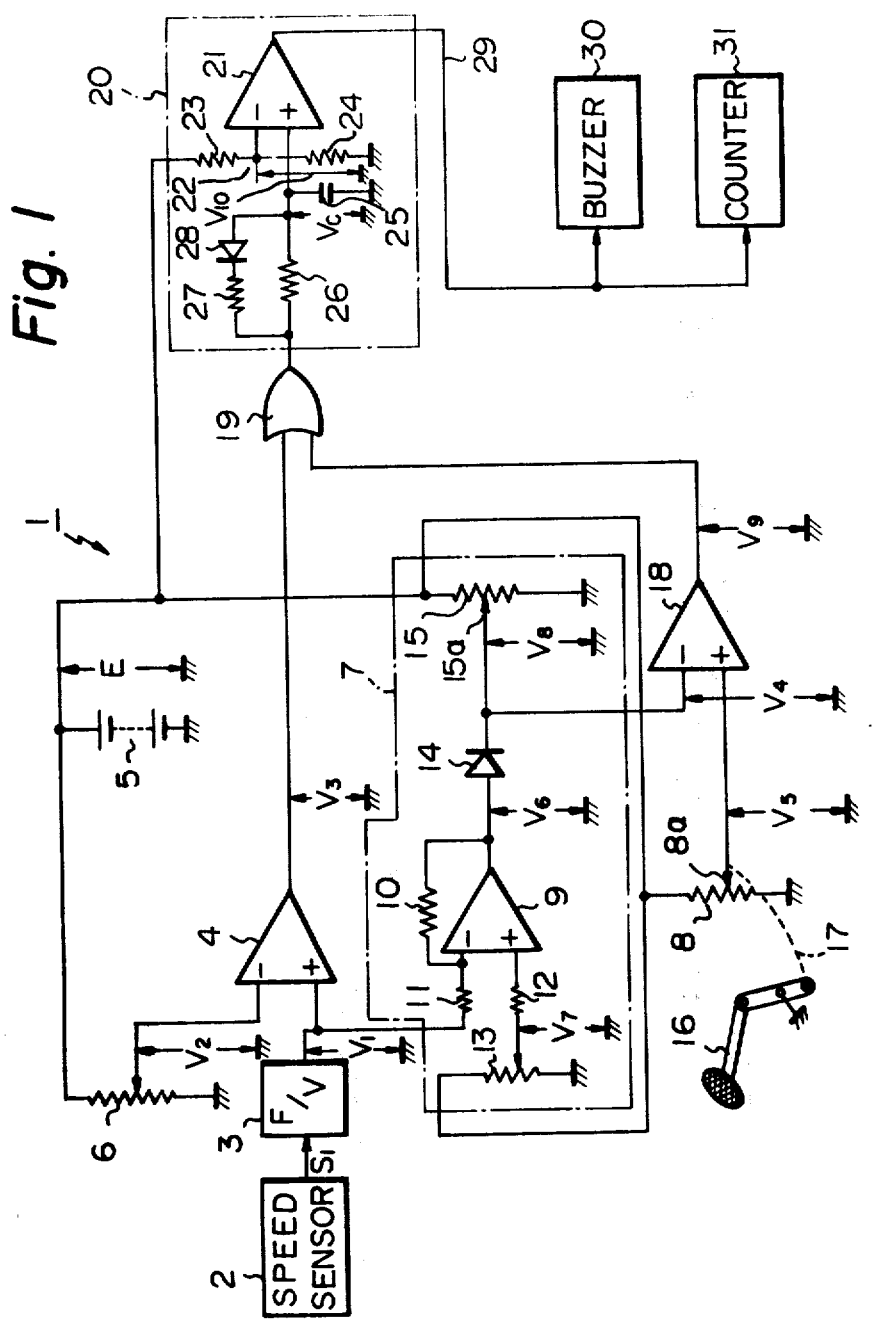
FIG. 1 is a circuit diagram of an embodiment of a vehicle fuel-efficiency warning device of the present invention.

In FIG. 1, there is shown a circuit diagram of an embodiment of a vehicle fuel-efficiency warning device 1 of the present invention, which is capable of issuing a warning to an operator when the vehicle is not operated within the desired fuel-efficiency conditions which are determined on the basis of engine speed and the degree of depression of the accelerator pedal. In this embodiment, the warning device 1 is fitted to a vehicle driven by a diesel engine; however, it will be understood from the following description that the warning device of the present invention is not limited in application to a diesel-engined vehicle. The vehicle fuel-efficiency warning device 1 has a speed sensor 2 for producing a speed signal $S_1$ whose frequency varies in accordance with the change in the speed N of a diesel engine (not shown), and the speed signal $S_1$ is applied to a frequency-voltage converter (F/V) 3 to convert the speed signal $S_1$ into a voltage signal $V_1$ whose level changes in accordance with the frequency of the speed signal $S_1$. As a result, the level of the voltage signal $V_1$ changes in proportion to the engine speed N as shown in FIG. 2A since the frequency of the speed signal $S_1$ is proportional to the engine speed N.

Figure 2A:
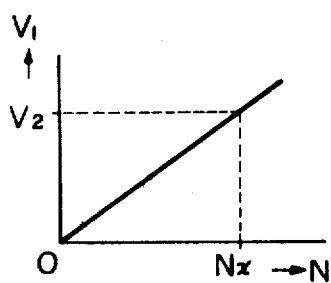
FIGS. 2A to 2E are characteristic curves showing level changes for voltages appearing in the circuit of FIG. 1, respectively.
Figure 2B:
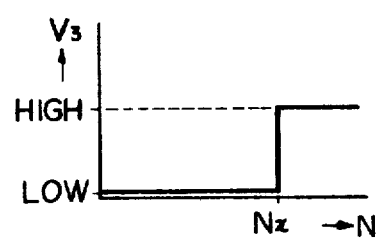

In order to discriminate when the engine speed N exceeds a limit engine speed $N_x$ which is the upper limit for operating the vehicle at a predetermined economical fuel-efficiency, the voltage signal $V_1$ is applied to a plus input terminal of a voltage comparator 4 having a minus input terminal to which a voltage $V_2$ whose level corresponds to the limit engine speed $N_x$ is applied (see FIG. 2A). The voltage $V_2$ is produced by dividing a regulated constant source voltage E by a variable resistor 6, with the level of the voltage $V_2$ able to be set at any desired value by adjusting the variable resistor 6. The limit engine speed $N_x$ can be determined experimentally or on the basis of design values of the engine of every vehicle, so that the variable resistor 6 may be adjusted so as to obtain the most suitable level of voltage $V_2$ for every vehicle in view of the determined value $N_x$. The level of the voltage signal $V_1$ is compared with that of the voltage $V_2$ by the voltage comparator 4 and the level of the output voltage $V_3$ of the voltage comparator 4 is changed from low to high when the level of the voltage signal $V_1$ exceeds that of the voltage $V_2$. Namely, when the engine speed N exceeds $N_x$, the level of the voltage $V_3$ is changed from low to high as illustrated in FIG. 2B. As a result, it is possible to judge from the level of the voltage $V_3$ whether or not the engine speed N is exceeding the value $N_x$.

The voltage signal $V_1$ is also applied to a reference voltage generating circuit 7 for producing a reference voltage $V_4$ which is compared with a voltage signal $V_5$ from a potentiometer 8. The reference voltage generating circuit 7 has an operational amplifier 9 through which an output voltage $V_6$ is fed back through a feedback resistor 10 to an inverting input terminal thereof so that the amplifier operates as an inverting amplifier.

Figure 2C:
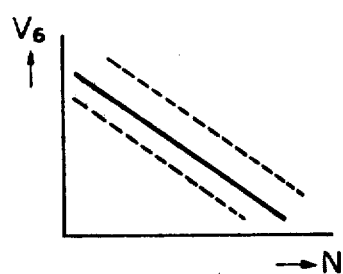
Figure 2D:
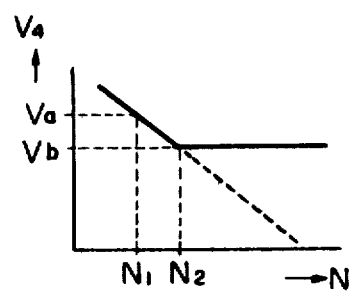

Ther voltage signal $V_1$ is applied through a resistor 11 to an inverting input terminal of the operational amplifier 9 which has a non-inverting input terminal to which a constant bias voltage $V_7$ is applied through a resistor 12. Therefore, the output voltage $V_6$ of the operational amplifier 9 is decreased in level in response to the increase of the engine speed N as illustrated by solid line of FIG. 2C. The characteristic curve of the level of the voltage $V_6$ shown in FIG. 2C can be moved by changing the level of the voltage $V_7$ in parallel with the curve shown by the solid line as shown by broken lines in FIG. 2C. To enable the characteristic curve to be changed while keeping the parallel relationship, a variable resistor 13 is employed to produce the bias volt-$V_7$ and the variable resistor 13 divides the voltage E at any desired rate to produce the desired bias voltage $V_7$. The degree of the slope of the characteristic curve of the voltage $V_6$ is selected to be any desired value by adjusting the resistance value of the resistor 10. The output voltage $V_6$ is applied to an anode of a diode 14 whose cathode is connected to a minus input terminal of a voltage comparator 18 which has a plus input terminal to which the voltage signal $V_5$ is applied. The cathode of the diode 14 is also connected with a movable contact 15a of a variable resistor 15 for producing a constant voltage $V_8$ by dividing the voltage E, and the constant voltage $V_8$ is applied to the cathode of the diode 14 as a clamping voltage. Consequently, the level of voltage $V_4$ is equal to that of the voltage $V_6$ when $V_6 > V_8$ and the level of voltage $V_4$ becomes a constant level which is equal to the level of the voltage $V_8$ when $V_6 \leq V_8$. The level of the reference voltage $V_4$ is a function of N as illustrated in FIG. 2D.

Figure 2E:
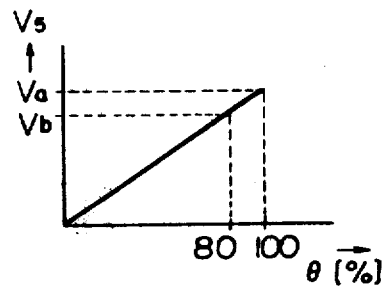

A shaft (not shown) of the potentiometer 8 is linked with an accelerator pedal 16 through a linking mechanism 17 in such a way that the movable contact 8a of the potentiometer 8 is positioned in accordance with the degree of depression of the accelerator pedal 16. Consequently, the voltage signal $V_5$ whose level varies in accordance with the degree of depression of the accelerator pedal 16 is produced from the potentiometer 8. In this embodiment, the characteristic of the voltage signal $V_5$ is determined in such a way that the level of the voltage signal $v_5$ is equal to $V_a$ when the degree of depression of the accelerator pedal 16 is 100(%) and is equal to $V_b$ when the degree is 80(%) as illustrated in FIG. 2E. The voltage signal $V_5$ showing the degree of depression of the accelerator pedal 16 is applied to the plus input terminal of a voltage comparator 18 having a minus input terminal to which the reference voltage $V_4$ is applied, and the voltage signal $V_5$ is compared in level with the voltage $V_4$ by the use of the comparator 18.

The relationship among the levels of the voltage signal $V_5$ and the voltages $V_6$ and $V_8$ will now be described hereinafter in conjunction with FIGS. 3A to 3C. The level of the clamping voltage $V_8$ is determined at constant value $V_b$ irrespective of the change of the engine speed N (FIG. 3C) and the level characteristic of the voltage $V_6$ is set in such a way that the level of the voltage $V_6$ is equal to $V_a$ when the engine speed N is $N_1$ and is equal to $V_b$ when N is at $N_2$ which is between $N_1$ and the $N_x$ (FIG. 3B). Therefore, the level of the voltage $V_4$ is coincident with that of the voltage $V_6$ in the range of $N \leq N_2$ and is equal to a voltage $V_b$ irrespective of the engine speed N in the range $N > N_2$ (FIG. 2D). The voltage level $V_a$ is equal to the level when the degree of depression of the accelerator pedal is 100(%) and the voltage level $V_b$ is equal to the level when the degree of depression of the accelerator pedal is 80(%) (FIG. 3A).

Since the output level of the voltage comparator 18 is high when $V_5 \leq V_4$ and low when $V_5 < V_4$, the output level is always low in the speed range below $N_1$ because the level of the voltage $V_5$ never exceeds the level of the voltage $V_4$. For the range of the engine speed above $N_2$, the output level of the voltage comparator 18 becomes high when the degree $\theta$ of depression of accelerator pedal 16 is equal to or more than 80(%). For the range of the engine speed between $N_1$ and $N_2$, since the level of the voltage $V_4$ has a tendency to decrease in accordance with the increase in the engine speed N, the level of the voltage $V_5$ is larger than the level corresponding to the engine speed at that time the output level of the voltage comparator 18 becomes high when the degree $\theta$ of the depression of the accelerator pedal is more than 80(%). That is, for the range of the engine speed between $N_1$ and $N_2$, the restriction for the degree of depression of the accelerator pedal will be gradually eased as the engine speed N is decreased. In this embodiment, the characteristic curve of the voltage $V_6$ in the range between $N_1$ and $N_2$ is linear, however, the configuration of this portion is not limited to a linear one and any proper appropriate configuration for this portion may be employed. Preferably, the configuration for this portion is similar to a corresponding part of an equiefficient fuel consumption curve as illustrated by the broken line K in FIG. 3B.

The output voltages $V_3$ and $V_9$ of the comparators 4 and 18 are applied to input terminals of an OR gate 19, respectively, and the output voltage of the OR gate 19 is applied to a delay circuit 20. As will be understood from the foregoing description, the output level of the OR gate 19 is low when the vehicle is operated in the operating region within the limit curve L shown in FIG. 4 and the output level of the gate 19 is high when the vehicle is operated outside of the limit curve L (that is, in the shaded region of FIG. 4).

The delay circuit 20 has a voltage comparator 21 having a minus input terminal connected to a bias circuit 22 composed of resistors 23 and 24, and a constant bias voltage $V_{10}$ produced by the bias circuit 22 is applied to the minus input terminal of the voltage comparator 21. A capacitor 25 is connected between the ground and a plus input terminal of the voltage comparator 21, and the plus input terminal is connected to the output terminal of the OR gate 19 through a resistor 26 and the parallel circuit of a resistor 27 and a diode 28. As a result, when the level of the output terminal of the OR gate 19 is changed from low to high, charging current flows through resistor 26 into the capacitor 25 and the charged voltage $V_c$ developed across the capacitor 25 is increased in accordance with the time-constant determined by the circuit constants of the resistor 26 and the capacitor 25. Then, when the charged voltage $V_c$ exceeds the bias voltage $V_{10}$, the output level of the voltage comparator 21 is changed from low to high. Consequently, the output level of the voltage comparator 21 becomes high at a predetermined time after the time the level of the OR gate 19 becomes high, and the predetermined time can be changed by adjusting the resistance value of the resistor 26. When the output level of the OR gate 19 is changed from high to low, the capacitor 25 is discharged through the diode 28 and the resistor 27 to reduce the charged voltage $V_c$. Since the resistance value of the resistor 27 is selected to be sufficiently small that the OR gate 19 is not destroyed by the discharge current from the capacitor 25, the charged voltage $V_c$ is rapidly reduced when the output level of the OR gate 19 is changed from high to low. If the output level of the OR gate 19 becomes high but is changed to low before the passing of the amount of time corresponding to the time lag determined by the time-constant of the resistor 26 and the capacitor 25, the output level of the delay circuit 20 does not immediately change in response to the change in the level of the OR gate 19.

The output line 29 is connected to a buzzer for issuing a warning sound and a counter for counting the number of states in which the output level of the comparator 21 becomes high. Therefore, the buzzer 30 is rendered operative when a predetermined time passes from the time when the level of the OR gate 19 becomes high. At the same time, the content of the counter 31 is increased by one. Of course, a lamp can be employed as a device for issuing a warning instead of the buzzer 30 or together with the buzzer.

With this arrangement, a warning is issued when the engine speed N becomes more than $N_x$ for a predetermined time, and in addition, in the relatively high engine speed region of $N_2 < N < N_x$, a warning is issued when the degree $\theta$ of depression of the accelerator pedal exceeds 80(%) of the maximum degree thereof for a predetermined time irrespective of the engine speed N. For the speed range of between $N_1$ and $N_2$, a warning is issued when the degree $\theta$ exceeds the value which is determined by the engine speed at that time for a predetermined time. Since the restriction for the degree $\theta$ of the depression of the accelerator pedal is gradually eased in the speed range between $N_1$ and $N_2$ as the engine speed is decreased, there is a remarkable decrease in the number of pointless warnings issued for large depressions of the accelerator pedal which are unavoidable, such as more than 80(%), which are liable to occur at lower speeds when the vehicle ascends an incline. As a result, the warning properly adapted to an actual circumstance on the vehicle operation will be issued to the operator, so that the operator is sufficiently urged to operate the vehicle at a higher fuel-efficiency without being subjected to unnecessary fatigue.

Figure 5:
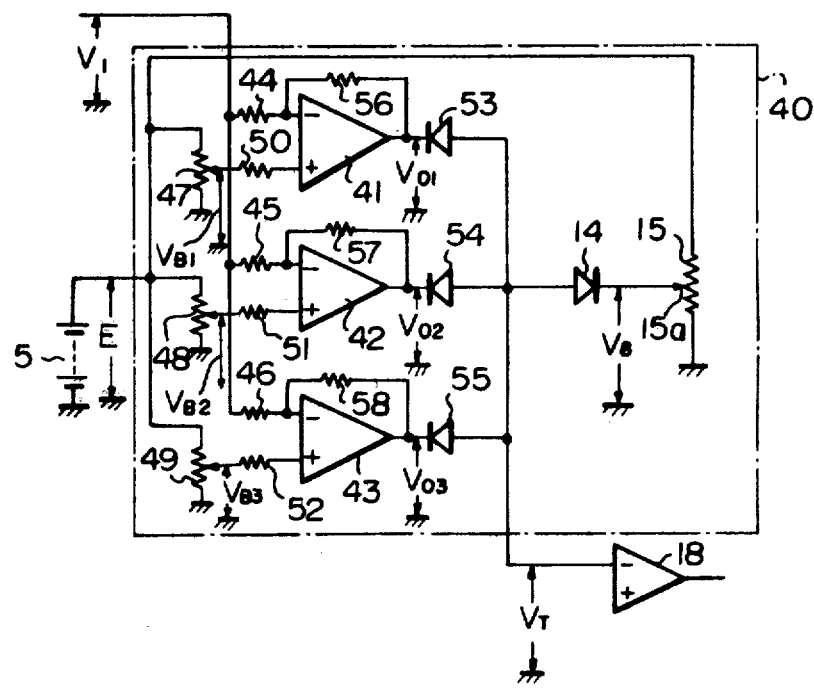
FIG. 5 is a circuit diagram of another embodiment of a reference voltage generating circuit of the device illustrated in FIG. 1.
Figure 6A:
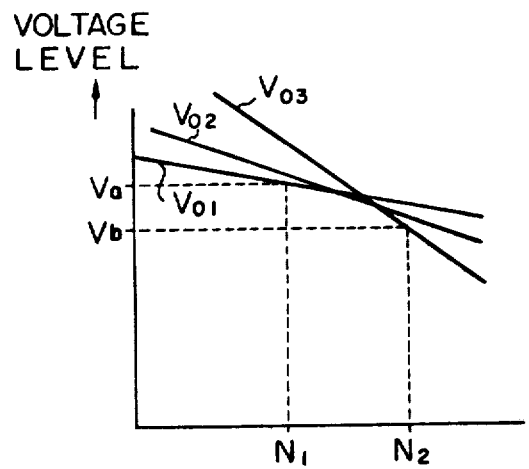
FIGS. 6A and 6B are views showing characteristic curves of the level changes of the voltage in the circuit 5 of FIG. 5.
Figure 6B:
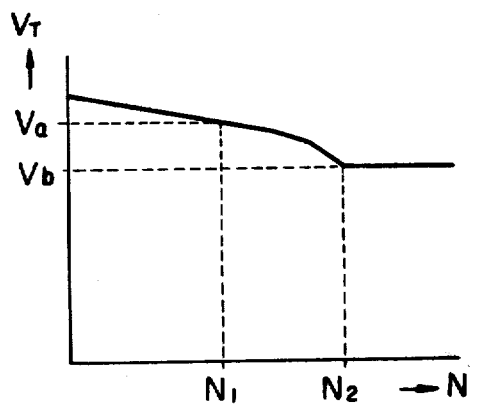

In FIG. 5, there is shown another embodiment of a reference voltage generating circuit 40 which corresponds to the reference voltage generating circuit 7 in FIG. 1. Therefore, in FIG. 5, the portions corresponding to the portions in FIG. 1 will be designated by like references. The circuit 40 has voltage comparators 41, 42 and 43 to each minus input terminal of which is applied the voltage signal $V_1$ through resistors 44, 45 and 46, respectively. There are provided variable resistors 47, 48 and 49 corresponding to the comparators 41 to 43 and these variable resistors 47, 48 and 49 are connected in parallel with the voltage source 5 to produce constant bias voltages $V_{B1}$, $V_{B2}$ and $V_{B3}$ which are applied to the corresponding plus input terminal through resistors 50 to 52 similarly to the circuit 7 in FIG. 1. The output terminals of the comparators 41, 42 and 43 are connected to the minus input terminal of the voltage comparator 18 through diodes 53 to 55, respectively, and are also connected to the minus input terminals through feedback resistors 56, 57 and 58. The characteristics of the output voltages $V_{01}$, $V_{02}$ and $V_{03}$ of the voltage comparators 41, 42 and 43 relative to the change in the engine speed are set to differ from each other by adjusting the resistance values of the feedback resistors 56, 57 and 58 and the variable resistor as shown in FIG. 6A. Since these voltages $V_8$, $V_{01}$, $V_{02}$ and $V_{03}$ are applied to the minus input terminal of the voltage comparator 18 through the diodes 14, 53, 54 and 55, the level of the voltage $V_T$ is equal to the voltage which has the lowest level at that time. Consequently, the level characteristic of the voltage $V_T$ will be as shown in FIG. 6B. As will be seen from the characteristic curve shown in FIG. 6B, the shape of the characteristic curve between $N_1$ and $N_2$ is similar to the shape of the curve K shown in FIG. 3B. In this embodiment, the characteristic curve of the voltage $V_T$ between $N_1$ and $N_2$ is formed so as to approximate an equiefficient fuel consumption curve by the use of the polygonal construction, however, it is possible to employ any other conventional approximation technique.

We claim:

1. A vehicle fuel-efficiency warning device used for a vehicle driven by an internal combustion engine, comprising:
    means for generating a first signal showing a rotational speed being related to an engine speed of said internal combustion engine;
    means responsive to said first signal for producing a first detecting signal when said rotational speed exceeds a predetermined upper limit speed;
    means for generating a second signal related to the position of a member for adjusting the amount of fuel supplied to said internal combustion engine;
    means for generating a third signal corresponding to an upper limit characteristic of the position of said member, said upper limit characteristic including a portion having a decrease tendency in accordance with the increase of said revolutional speed;
    means responsive to said second and said third signals for producing a second detecting signal when the position of said member exceeds the upper limit of the position of said member determined by said third signal; and
    means for issuing a warning in response to the occurrence of said first and or said second detecting signals.

2. A vehicle fuel-efficiency warning device as claimed in claim 1 wherein said means for generating a second signal is composed of a potentiometer for dividing a constant voltage in response to the position of said member.

3. A vehicle fuel-efficiency warning device as claimed in claim 2 wherein said member is an accelerator pedal operatively connected to said potentiometer to produce thereby the second signal whose level veries in response to degree of the accelerator pedal.

4. A vehicle fuel-efficiency warning device as claimed in claim 1 wherein said third signal is a voltage signal whose level is a function of the rotational speed.

5. A vehicle fuel-efficiency warning device as claimed in claim 1 wherein said portion is set in the range of intermediate engine speed.

6. A vehicle fuel-efficiency warning device as claimed in claim 5 wherein the upper limit characteristic in the high engine speed range, which is provided at the high speed side of said portion, does not depend upon the engine speed.

7. A vehicle fuel-efficiency warning device as claimed in claim 5 wherein the figure of said portion is similar to that of an equiefficient fuel consumption curve.

8. A vehicle fuel-efficiency warning device used for a vehicle driven by an internal combustion engine, comprising:
    means for generating a first signal showing a rotational speed related to an engine speed of said internal combustion engine;
    means responsive to said first signal for producing a first detecting signal when said rotational speed exceeds a predetermined upper limit speed;
    means for generating a second signal related to the position of a member for adjusting the amount of fuel supplied to said internal combustion engine;
    means for generating a third signal corresponding to an upper limit characteristic of the position of said member, said upper limit characteristic including a portion having a decrease tendency in accordance with the increase of said revolutional speed;
    means responsive to said second and said third signals for producing a second detecting signal when the position of said member exceeds the upper limit of the position of said member determined by said third signal;
    means responsive to said first and said second detecting signals for producing an electrical signal when said first and or said second detecting signal is continuously produced for a predetermined time; and
    means for issuing a warning in response to the occurrence of said electrical signal.

* * * * *